United States Patent [19]

Vanderpool et al.

[11] Patent Number: 4,961,910

[45] Date of Patent: Oct. 9, 1990

[54] RECOVERY OF TUNGSTEN AND MOLYBDENUM

[75] Inventors: Clarence D. Vanderpool, Towanda; John A. Powers, New Albany, both of Pa.

[73] Assignee: GTE Products Corporation, Stamford, Conn.

[21] Appl. No.: 70,744

[22] Filed: Jul. 6, 1987

Related U.S. Application Data

[63] Continuation of Ser. No. 881,560, Jul. 3, 1986, abandoned.

[51] Int. Cl.$^5$ .................... C01G 39/00; C01G 41/00; C22B 3/00
[52] U.S. Cl. .................................. 423/53; 423/57; 75/711; 75/743
[58] Field of Search ............... 75/121, 101 R, 97 A, 75/2; 423/53, 57

[56] References Cited

U.S. PATENT DOCUMENTS 3,307,938  3/1967  Ronzio et al. .................. 423/57

FOREIGN PATENT DOCUMENTS 118750  8/1944  Australia .......................... 423/53
459554  1/1937  United Kingdom ............ 423/53
860890  2/1961  United Kingdom ............ 423/53

OTHER PUBLICATIONS

Li, K. C., "Chemical Processing Tungsten Ores and Concentrates" Journal of Metals, Jun. 1962, pp. 413–417.

Perry, Robert H., *Perry's Chemical Engineers' Handbook* 6th Ed., Pub. by McGraw–Hill, NY, New York (1984) pp. 19-71, 19-72.

*Primary Examiner*—Jeffrey E. Russel
*Assistant Examiner*—Steven J. Bos
*Attorney, Agent, or Firm*—D. R. Castle; L. Rita Quatrini

[57] ABSTRACT

Methods are disclosed for recovering one or more of the metals of tungsten and molybdenum from metal-cellulose material. One method involves digesting the material in a mineral acid selected from the group consisting of hydrochloric acid having a concentration of at least about 4 normal, and sulfuric acid having a concentration of at least about 9 normal at a temperature of at least about 50° C. for a sufficient time to form a digestion solid containing the major portion of the tungsten and a digestion solution containing a portion of any molybdenum which is present in the material, and separating the solid from the solution. Another method involves having as the starting material a metal-cellulose material comprising one or more of the metals of tungsten and molybdenum and elements selected from the group consisting of arsenic, phosphorus, silicon, and combinations thereof. The digestion is carried out as described above to form a digestion solution containing the major portion of any tungsten and molybdenum which is present, and a residue, followed by separating the digestion solution from the residue.

12 Claims, No Drawings

4,961,910

RECOVERY OF TUNGSTEN AND MOLYBDENUM

This application is a continuation of application Ser. No. 06/881,560, filed July 3, 1986, now abandoned.

BACKGROUND OF THE INVENTION

This invention relates to a method for the recovery of tungten and molybdenum from material which contains metals and cellulose.

In the processing of molybdenum and tungsten ores to obtain pure products and in other processing operations involving molybdenum and tungsten there are usually a number of filtration operations. These operations typically involve use of filter presses which contain a filter paper backed up with some material which is reused. Because processing efficiencies are usually not 100% there remains on the filter paper some molybdenum and tungsten. It would be desirable from an economic standpoint to have a method to recover these valuable metals from the filter paper so they can be used.

SUMMARY OF THE INVENTION

In accordance with one aspect of this invention there is provided a method for recovering one or more of the metals of tungsten and molybdenum from metal-cellulose material containing one or more of the metals of tungsten and molybdenum. The method involves digesting the material in a mineral acid selected from the group consisting of hydrochloric acid having a concentration of at least about 4 normal, and sulfuric acid having a concentration of at least about 9 normal at a temperature of at least about 50° C. for a sufficient time to form a digestion solid containing the major portion of the tungsten and a digestion solution containing a portion of any molybdenum which is present in the material, and separating the solid from the solution.

In accordance with another aspect of the invention, there is provided a method for recovering one or more of the metals of tungsten and molybdenum from metal-cellulose material comprising one or more of the metals of tungsten and molybdenum and elements selected from the group consisting of arsenic, phosphorus, silicon, and combinations thereof. The method involves acid digesting the material as described previously to form a digestion solution containing the major portion of any tungsten and molybdenum which is present and a residue, followed by separating the digestion solution from the residue.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting materials of this invention from which tungsten and/or molybdenum is to be recovered is metal-cellulose material. In particular, the cellulose is preferably filter paper or cotton with filter paper being especially preferred. The cellulose contains residues of tungsten and/or molybdenum processing operations. Typical residues are those resulting from the digestion of ores with some base such as sodium hydroxide or sodium carbonate especially for tungsten, and ammonium hydroxide especially for molybdenum. Also residues resulting from leaching of alkali fused material can be used as the starting material of this invention. Another type of material of this invention results from conversion processes of ammonium paratungstate to ammonium metatungstate. In this case, the starting material of this invention is that which has not been converted to ammonium metatungstate or which has changed to the oxide. Another type of starting material is the residue which results when ammonium molybdate solutions are filtered prior to crystallizing ammonium paramolybdate.

The above described material is first digested in a strong acid such as hydrochloric acid having a normality of at least about 4, or sulfuric acid having a normality of at least about 9 at a temperature of at least about 50° C. for a sufficient time to form a digestion solid containing the major portion of any tungsten which is present in the material and a digestion solution containing a portion of any molybdenum which is present in the material.

The preferred acid concentrations are from about 6 normal to about 12 normal if hydrochloric acid is used and from about 9 normal to about 18 normal if sulfuric acid is used.

The preferred digestion temperatures are from about 70° C. to about 110° C. and most preferably from about 100° C. to about 110° C. The digestion is at least about 50° C. because below about 50° C. the tungstic acid which forms does not settle easily and presents a separation problem when the resulting digestion solution and solid are separated.

Digestion time depends on the temperature, nature of the equipment, size of the charge, etc. However, the preferred digestion times at the preferred temperatures are from about 4 hours to about 8 hours and most preferably from about 4 hours to about 6 hours.

As result of the digestion, the major portion of the tungsten is in the solid typically as tungstic acid if the material contains tungsten. If molybdenum is present in the material a portion of the material and most typically essentially all of the molybdenum reports with the digestion solution. If any iron and manganese are present in the material, the major portion of these elements is solubilized. The filter paper decomposes in the acid and the major portion of it is solubilized.

The resulting digestion solution is then separated from the digestion solid by any standard technique such as filtration.

The tungsten in the digestion solid can then be recovered by standard methods such as by drying and firing to convert it to tungstic oxide and to remove any organics.

The molybdenum in solution can be recovered by standard methods for recovery from acid solutions.

Another aspect of this invention involves recovery of tungsten and/or molybdenum from a specific type of material. This material results from purification operations in which arsenic, phosphorus, silicon or combinations of these elements are removed from tungsten and/or molybdenum solutions by precipitation. The resulting precipitation solid or residue can contain compounds of tungsten and/or molybdenum and arsenic, phosphorus, silicon or combinations of these elements. It is desirable to recover the tungsten and/or molybdenum. This type of material is digested according to the procedure described previously. The digestion solution contains the major portion of the tungsten and molybdenum. The tungsten and molybdenum are believed to be present primarily as heteropoly compounds with arsenic, phosphorus, or silicon.

The digestion solution and the resulting residue are then separated by any standard technique such as filtration.

The tungsten and molybdenum can be recovered from this digestion solution by standard methods.

By the process of this invention tungsten and/or molybdenum can be recovered from residues thereby saving these valuable metals and eliminating the high cost of disposal of the residues.

To more fully illustrate this invention, the following non-limiting examples are presented. All parts, portions, and percentages are on a weight basis unless otherwise stated.

EXAMPLE 1

About 100 parts of filter paper containing about 3.0% by weight $WO_3$ is slurried in about 440 parts of 6 normal HCl for about 6 hours at about 95° to 100° C. After this period, the resulting digestion mixture is filtered to separate the solid from the solution. The solid tungstic acid is dried and fired at a temperature of about 500° C. for about 4 hours to convert it to tungstic oxide. This firing step also removes any organics which may be present. About 98% by weight of the tungsten which was in the starting filter paper is recovered as tungstic oxide.

EXAMPLE 2

About 10 parts of filter paper used in the preparation of ammonium metatungstate is slurried in about 130 parts of sulfuric acid which is at a concentration of about 9 normal. The resulting mixture is agitated at about 50° to 60° C. for about 7 hours or until it appears that essentially all of the filter paper dissolves. The resulting greenish-yellow solution is filtered to recover the insoluble tungsten which is dried at about 110° C. for about 16 hours. It is then fired at about 750° C. to decompose any remaining organic material and to convert the tungstic acid to tungstic oxide.

EXAMPLE 3

About 100 parts of filter paper used in the manufacture of sodium tungstate are slurried in about 200 parts of hot (90°–95° C.) water. This slurry is then added to about 360 parts of 12N hydrochloric acid which has been heated to a temperature of about 55° to 58° C. The resulting mixture is allowed to digest with agitation at about 80° to about 85° C. for about 4 hours after which time the resulting solid is allowed to settle. The solid is then filtered off, dried and fired at about 750° C. for about 16 hours to convert it to tungstic oxide.

EXAMPLE 4

About 15 full 55 gallon drums containing filter paper residues from processes in which ammonium metatungstate was preciptated and tungstic acid was precipitated, are digested in about 600 gallons of 6N hydrochloric acid at about 70° C. for about 4 hours. The resulting mixture is filtered and the digestion solids are washed on a press. The resulting digestion solids containing tungstic acid are then processed by a standard caustic digestion process. The yield of $WO_3$ from the process is about 889 pounds.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for recovering one or more of the metals of tungsten and molybdenum, said method comprising:
   (a) filtering a solution containing elements selected from the group consisting of tungsten, molybdenum, and combinations thereof, through a cellulose material whereby at least some of said elements are retained on said cellulose material;
   (b) digesting said cellulose material containing the retained elements in a mineral acid selected from the group consisting of hydrochloric acid having a concentration of at least about 4 normal and sulfuric acid having a concentration of at least about 9 normal, at a temperature of at least about 50° C. for a sufficient time to form a digestion solid containing the major portion of any tungsten which is present in said material and a digestion solution containing a portion of any molybdenum which is present in said material;
   (c) separating said solid from said solution; and
   (d) recovering tungsten from said solid and recovering molybdenum from said solution.

2. A method of claim 1 wherein the cellulose is selected from the group consisting of filter paper and cotton.

3. A method of claim 2 wherein the cellulose is filter paper.

4. A method of claim 1 wherein said mineral acid is hydrochloric acid in a concentration of from about 6 normal to about 12 normal.

5. A method of claim 1 wherein said mineral acid is sulfuric acid in a concentration of from about 9 normal to about 18 normal.

6. A method of claim 1 wherein the digestion is carried out at a temperature of from about 70° C. to about 110° C. for from about 4 hours to about 16 hours.

7. A method for recovering one or more of the metals of tungsten and molybdenum, said method comprising:
   (a) filtering a solution containing a first set of elements selected from the group consisting of tungsten, molybdenum, and combinations thereof and a second set of elements selected from the group consisting of arsenic, phosphorus, silicon, and combinations thereof, through a cellulose material whereby at least some of the elements from said first and second sets are retained on said cellulose material;
   (b) digesting said cellulose material containing the retained elements in a mineral acid selected from the group consisting of hydrochloric acid having a concentration of at least about 4 normal and sulfuric acid having a concentration of at least about 9 normal at a temperature of at least about 50° C. for a sufficient time to form a digestion solution containing the major portion of any tungsten and molybdenum which is present in said material and a digestion residue;
   (c) separating said digestion solution from said residue; and
   (d) recovering tungsten and molybdenum from said digestion solution.

8. A method of claim 7 wherein the cellulose is selected from the group consisting of filter paper and cotton.

9. A method of claim 8 wherein the cellulose is filter paper.

10. A method of claim 7 wherein said mineral acid is hydrochloric acid in a concentration of from about 6 normal to about 12 normal.

11. A method of claim 7 wherein said mineral acid is sulfuric acid in a concentration of from about 9 normal to about 18 normal.

12. A method of claim 7 wherein the digestion is carried out at a temperature of from about 70° C. to about 110° C. for from about 4 hours to about 16 hours.

* * * * *